United States Patent
Alattar et al.

(10) Patent No.: US 7,152,021 B2
(45) Date of Patent: Dec. 19, 2006

(54) COMPUTING DISTORTION OF MEDIA SIGNALS EMBEDDED DATA WITH REPETITIVE STRUCTURE AND LOG-POLAR MAPPING

(75) Inventors: Adnan M. Alattar, Tigard, OR (US); Joel R. Meyer, Lake Oswego, OR (US)

(73) Assignee: Digimarc Corporation, Beaverton, OR (US)

( * ) Notice: Subject to any disclaimer, the term of this patent is extended or adjusted under 35 U.S.C. 154(b) by 113 days.

(21) Appl. No.: 10/636,515

(22) Filed: Aug. 6, 2003

(65) Prior Publication Data

US 2004/0133427 A1    Jul. 8, 2004

Related U.S. Application Data

(60) Provisional application No. 60/434,823, filed on Dec. 18, 2002, provisional application No. 60/428,485, filed on Nov. 21, 2002, provisional application No. 60/404,038, filed on Aug. 15, 2002.

(51) Int. Cl.
    *H04K 1/00*    (2006.01)
(52) U.S. Cl. ....................... 702/191; 382/100
(58) Field of Classification Search ............ 702/57–59, 702/62, 66–71, 79, 80, 84, 106, FOR. 103, 702/FOR. 104, FOR. 110, FOR. 166; 370/493–495, 370/503, 468, 508–510, 512, 516; 342/26, 342/28, 104, 107, 109, 113–115, 118, 134, 342/139, 146, 147, 175, 195, 101, 159, 202–204; 455/295, 296, 63.1, 302–306; 375/220
See application file for complete search history.

(56) References Cited

U.S. PATENT DOCUMENTS

| | | |
|---|---|---|
| 5,613,004 A | 3/1997 | Cooperman et al. |
| 5,687,191 A | 11/1997 | Lee et al. |
| 5,835,639 A | 11/1998 | Honsinger et al. |
| 5,859,920 A | 1/1999 | Daly et al. |
| 5,862,260 A | 1/1999 | Rhoads |
| 5,930,369 A | 7/1999 | Cox et al. |
| 5,949,055 A * | 9/1999 | Fleet et al. .................. 235/469 |
| 6,078,664 A | 6/2000 | Moskowitz et al. |
| 6,122,403 A | 9/2000 | Rhoads |
| 6,128,401 A | 10/2000 | Suzuki et al. |
| 6,208,735 B1 | 3/2001 | Cox et al. |
| 6,233,347 B1 * | 5/2001 | Chen et al. .................. 382/100 |
| 6,240,121 B1 | 5/2001 | Senoh |
| 6,282,300 B1 * | 8/2001 | Bloom et al. ................ 382/100 |
| 6,370,258 B1 | 4/2002 | Uchida |
| 6,408,082 B1 | 6/2002 | Rhoads et al. |
| 6,424,725 B1 | 7/2002 | Rhoads et al. |
| 6,614,914 B1 | 9/2003 | Rhoads et al. |
| 6,704,869 B1 * | 3/2004 | Rhoads et al. .............. 713/176 |
| 6,765,950 B1 * | 7/2004 | Nuytkens et al. ........... 375/130 |

(Continued)

FOREIGN PATENT DOCUMENTS

EP    0 977 434    2/2000

(Continued)

OTHER PUBLICATIONS

U.S. Appl. No. 60/434,823, filed Dec. 18, 2002, Alattar.

(Continued)

*Primary Examiner*—Carol S. W. Tsai
(74) *Attorney, Agent, or Firm*—Digimarc Corporation

(57) ABSTRACT

A digital watermark detection method uses a matched filtering technique on a log polar re-mapping of a watermarked signal to detect peaks associated with a repetitive structure of a watermark.

6 Claims, 3 Drawing Sheets

U.S. PATENT DOCUMENTS

| | | | | |
|---|---|---|---|---|
| 6,795,565 | B1* | 9/2004 | Wendt | 382/100 |
| 6,804,375 | B1 | 10/2004 | Muratani | |
| 6,845,170 | B1 | 1/2005 | Wendt | |
| 2002/0076084 | A1* | 6/2002 | Tian et al. | 382/100 |
| 2002/0099943 | A1* | 7/2002 | Rodriguez et al. | 713/716 |
| 2002/0126870 | A1 | 9/2002 | Wendt | |
| 2002/0157005 | A1* | 10/2002 | Brunk et al. | 713/176 |
| 2003/0039376 | A1* | 2/2003 | Stach | 382/100 |
| 2003/0039377 | A1* | 2/2003 | Rhoads et al. | 382/100 |
| 2003/0081857 | A1* | 5/2003 | Tapson | 382/275 |
| 2003/0133589 | A1* | 7/2003 | Deguillaume et al. | 382/100 |
| 2004/0187004 | A1* | 9/2004 | Ray et al. | 713/716 |
| 2004/0267533 | A1* | 12/2004 | Hannigan et al. | 704/273 |

FOREIGN PATENT DOCUMENTS

| | | |
|---|---|---|
| WO | WO 0211326 | 2/2002 |

OTHER PUBLICATIONS

U.S. Appl. No. 60/428,485, filed Nov. 21, 2002, Alattar.

U.S. Appl. No. 60/404,038, filed Sep. 15, 2002, Alattar.

Bender et al., "Techniques for Data Hiding," SPIE vol. 2420, Jan. 1995, pp. 164-173.

Bender et al., "Techniques for Data Hiding," IBM Systems Journal, vol. 35, Nos. 3&4, 1996, pp. 313-336.

Cox et al., "Secure Spread Spectrum Watermarking for Multimedia," NEC Research Institute Technical Report, Dec. 5, 1995, 33 pages.

Kutter, "Watermarking Resisting to Translation, Rotation and Scaling," Proc. of SPIE: Multimedia Systems and Applications, vol. 3528, pp. 423-431, Boston, Nov. 1998.

Matsui et al., "Embedding a Signature to Pictures Under Wavelet Transformation," Transactions of the Institute of Electronics Information and Communication Engineers D-II, vol. J79D-II, No. 6, Jun. 1996, pp. 1017-1024.

Meerwald et al., "A Survey of Wavelet-Domain Watermarking Algorithms," Proc. of SPIE vol. 4314 (2001), pp. 505-516.

Ohnishi et al., Embedding a Seal into a Picture Under Orthogonal Wavelet Transform, Proceedings of Multimedia '96, 1996, IEEE, pp. 514-521.

ORuanaidh et al, "Watermarking Digital Images for Copyright Protection," http://www.kalman.mee.tcd.ie/people/jjr/eva_pap.html, Feb. 2, 1996, 8 pages. (Also published Aug. 1996, IEE Proceedings-Vision, Image and Signal Processing, vol. 143, No. 4, pp. 250-256.).

Ó Ruanaidh, et al., Phase Watermarking of Digital Images. Proc ICIP-96, Lausanne, Switzerland, Sep. 16-19, 1996. p. 239-242.

O'Ruanaidh et al., "Rotation, Scale and translation Invariant Digital Image Watermarking," Int. Conf. on Image Proc., Oct. 1997, IEEE, pp. 536-539.

O'Ruanaidh et al., "Rotation, Scale and Translation Invariant Spread Spectrum Digital Image Watermarking," Signal Processing 66, May 1, 1998, pp. 303-317.

O'Ruanaidh et al., "Rotation, Scale and Translation Invariant Digital Image Watermarking," submitted to Signal Processing, Aug. 21, 1997, pp. 2-19.

Pereira et al., Template Based Recovery of Fourier-Based Watermarks Using Log-Polar and Log—Log Maps, Proc. IEEE Int. Conf. on Multimedia Computing and Systems, 1999, Part vol. 1, pp. 870-874.

Sheng et al., "Experiments on Pattern Recognition Using Invariant Fourier-Mellin Descriptors," Journal of Optical Society of America, vol. 3, No. 6, Jun. 1986, pp. 771-776.

Su et al., "An Image Watermark Scheme to Resist Generalized Geometrical Transformations," Proc. of SPIE: Multimedia Systems and Applications III, vol. VV08, Boston, USA, Nov. 2000.

* cited by examiner

Fig. 2A        Fig. 2B
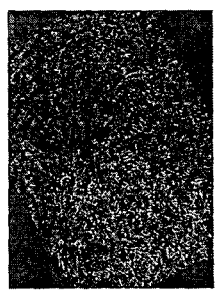
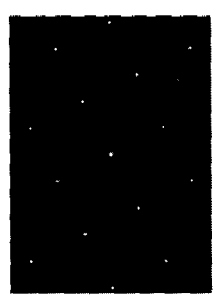
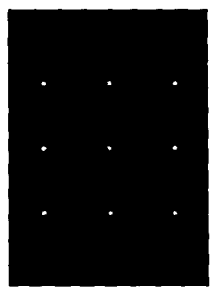
Fig. 3A        Fig. 3B        Fig. 3C

COMPUTING DISTORTION OF MEDIA SIGNALS EMBEDDED DATA WITH REPETITIVE STRUCTURE AND LOG-POLAR MAPPING

RELATED APPLICATION DATED

This application claims the benefit of the following provisional applications: 60/434,823, filed Dec. 18, 2002, 60/428,485, filed Nov. 21, 2002, and 60/404,038, filed Aug. 15, 2002, which are hereby incorporated by reference.

TECHNICAL FIELD

The invention relates to digital watermarking, and particularly to digital watermarking of image and video signals.

BACKGROUND AND SUMMARY

Digital watermarking is a process for modifying physical or electronic media to embed a hidden machine-readable code into the media. The media may be modified such that the embedded code is imperceptible or nearly imperceptible to the user, yet may be detected through an automated detection process. Most commonly, digital watermarking is applied to media signals such as images, audio signals, and video signals. However, it may also be applied to other types of media objects, including documents (e.g., through line, word or character shifting), software, multi-dimensional graphics models, and surface textures of objects.

Digital watermarking systems typically have two primary components: an encoder that embeds the watermark in a host media signal, and a decoder that detects and reads the embedded watermark from a signal suspected of containing a watermark (a suspect signal). The encoder embeds a watermark by subtly altering the host media signal. The reading component analyzes a suspect signal to detect whether a watermark is present. In applications where the watermark encodes information, the reader extracts this information from the detected watermark.

Several particular watermarking techniques have been developed. The reader is presumed to be familiar with the literature in this field. Particular techniques for embedding and detecting imperceptible watermarks in media signals are detailed in the assignee's application Ser. No. 09/503,881 (now U.S. Pat. Nos. 6,614,914) and 6,122,403, which are hereby incorporated by reference. This application is also related to U.S. Provisional Application 60/404,038, filed Aug. 15, 2002, and 60/428,485, filed Nov. 21, 2002.

The invention provides a method of determining distortion of a signal with embedded data. This method transforms the signal into a transform domain to produce peaks due to a repetitive structure of the embedded data in the signal. The method then performs a re-mapping of the transformed signal to convert distortion into spatial shifts. The method performs a correlation of the mapped signal with a signal representing an expected pattern of peaks associated with the repetitive structure of the embedded data signal. This correlation detects the spatial shifts of the embedded data, and these spatial shifts provide a measure of the distortion of the signal.

This method is specifically used for synchronizing a digital watermark. An embodiment of the method computes an autocorrelation of a watermarked image, maps the autocorrelation signal to a log polar coordinate system, and correlates the log polar representation of the autocorrelation signal with a template to compute rotation and spatial scaling of the embedded digital watermark. In this method, the digital watermark has a regular, repetitive (e.g., periodic) structure. In particular, the watermark w(x,y) is constructed by repeating an elementary watermark tile ŵ(x,y) (of size N×M) in a non-overlapping fashion. This tiled structure of the watermark can be detected by autocorrelation, where the autocorrelation of the watermarked signal has a peak at the center of each tile. These peaks form a template comprising a two dimensional array of uniformly spaced points. Rotation of the watermarked signal causes a rotation of this array. Also, spatial scaling of the watermarked signal changes the spacing between the points. To determine rotation and scale of a geometrically distorted version of the watermarked signal, the watermark detector performs a log-polar transformation of the autocorrelation signal to convert rotation and scale changes to the peaks in the autocorrelation signal to linear shifts. A linear correlation between a template and the autocorrelation peaks in the log polar domain produces a correlation peak at a location corresponding to the rotation and scale of the watermark relative to its original orientation. This rotation and scale is then used to return the watermarked signal to its original orientation. The watermark signal may then be decoded using one of many known watermark encoding/decoding schemes.

BRIEF DESCRIPTION OF THE DRAWINGS

FIGS. 2A and 2B are watermarked images. FIG. 2A is the original watermarked image, and FIG. 2B is the watermarked image rotated 27° counter-clockwise and scaled 0.91%.

FIG. 3A is the watermarked image of FIG. 2B after filtering with a high pass non-linear filter. FIG. 3B is the autocorrelation of the image in FIG. 3A. FIG. 3C is a hypothetical autocorrelation of an un-scaled and un-rotated digital watermark. This autocorrelation represents a template pattern.

DETAILED DESCRIPTION

Figure 1:
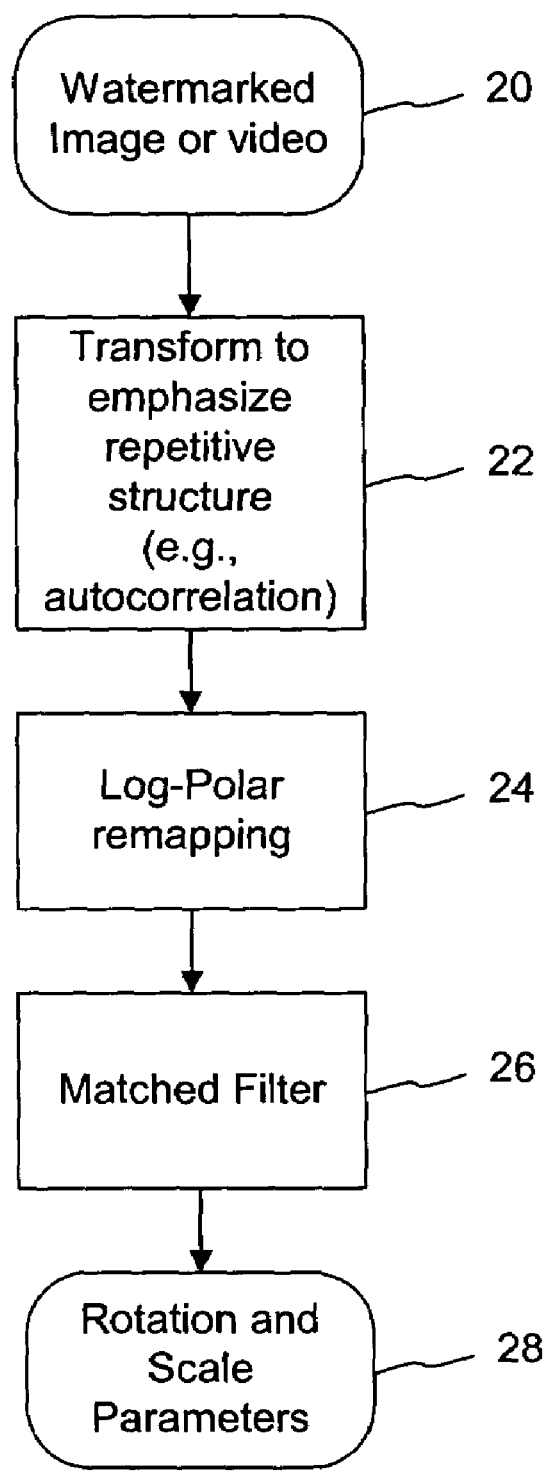
FIG. 1 is a flow diagram illustrating a detection process that exploits the repetitive structure in the log polar domain.

This document describes methods and systems for digital watermark embedding and reading in media signals, including still image and video signals. Current embodiments of these methods are implemented in software instructions, and in particular, the C and/or C++ programming language. These methods may also be implemented in digital hardware circuitry, firmware, or a combination of hardware, software and firmware.

This section provides a description of an implementation for determining distortion of media signals, such as still image and video signals. The method is particularly used to synchronize a digital watermark detector by computing geometric distortion of an image using data embedded in the image. The method may be adapted to other types of signals including temporal signals like audio, and may be applied to the log-log mapping, log-polar mapping, and other combinations of log or polar mappings of a media signal. In media signals with a temporal component like audio and video, the techniques described for detecting embedded data with spatial scaling can be applied to detect time (also referred to as temporal) scaling, such as with time scale changes, speed increases or decreases, and other distortions to the time scale of the signal.

Watermarking algorithms, such as those described in U.S. Pat. No. 6,122,403, embed the watermark into the image as contiguous non-overlapping tiles. This tiling structure forms an implicit synchronization template that can be revealed through autocorrelation. This template is composed of a set of weak peaks, replicating the relative position of the watermark tiles. Hence, synchronization can be resolved by comparing the actual locations of these peaks to the theoretical ones to determine the scaling factor and the orientation angle of the tiles. Unfortunately, these peaks are very weak and measuring their locations directly is not easy. In this document, a log-polar mapping of the synchronization template is computed to convert the scaling factor and the rotation angle of the template into vertical and horizontal shifts. These shifts are then detected using a Phase-Only-Matched filter (POM), which concentrates the weak energy from all peaks into a single peak that is much easier to detect. The scaling factor and orientation angle are determined from the location of this peak. Simulation results of this method have shown that this method is very effective and produces accurate results.

Digital watermarking is the technique of hiding information in media such as image, video, and audio. Due to its many important applications, watermarking has become an important field during the past decade. Its applications include authentication, copyright protection, fingerprinting, video monitoring, connected media, and device control. In most of these applications, the media undergoes unintentional manipulations and processing that usually cause a change in the scale and rotation of the watermarked media. Moreover, in many of these applications, attackers may attempt to defeat the watermark as a security feature by intentionally changing the scale and rotation of the media. Therefore, a robust watermarking system must be capable of re-synchronizing itself against scaling and rotation.

The use of an exhaustive search is the easiest, but most computationally intensive and hence most time-consuming, method of geometric synchronization. The template approach, however, has the potential to provide a more efficient geometric synchronization. It uses an explicit, but hidden, synchronization template to guide the resynchronization process. In some implementations, the template is a constellation of peaks embedded in the magnitude of the Fourier transform of the media. The Fourier magnitude rotates and shrinks/expands according to the rotation and scaling of the original image. Hence, the rotation angle and the scaling factor can be easily determined from the template. The Fourier-Mellin transform has been used to convert the scaling factor and rotation angle into horizontal and vertical shifts. See, for example, U.S. Pat. No. 6,122,403 and related parent patents. Also, a POM has been used to effectively detect these shifts. As with other approaches, this approach forces a trade-off between robustness and capacity of the watermark due to the allocation of energy between synchronization and variable message portion of the watermark.

A self-synchronizing watermark has been proposed as another method for geometric synchronization. See, for example, the approach of encoding in bit cells in U.S. Pat. No. 6,122,403. In this approach, a pseudo-random watermark is tiled over the image in a non-overlapping fashion. The tiling structure forms an implicit template that can be revealed by computing the autocorrelation of the image. In this case, the autocorrelation function contains a regular pattern of peaks, replicating the relative position of the watermark tiles. By comparing the actual locations of these peaks with the theoretical ones the synchronization can be resolved. Unfortunately, these peaks are sometimes weak, and detecting them may be difficult.

In this document, we propose to detect the autocorrelation peaks of the self-synchronizing watermark through a process similar to that used with the explicit template approach described above. For this purpose, a log-polar mapping of the autocorrelation image is computed to convert the scaling factor and the rotation angle into vertical and horizontal shifts. These shifts are then detected using a Phase-Only-Matched filter, which concentrates the weak energy from all peaks into a single peak that is much easier to detect.

FIG. 1 is a flow diagram illustrating a detection process that exploits the repetitive structure in the log polar domain. The detector receives as input a watermarked image signal 20, which may be a still image or moving image sequence (e.g., video). The detector transforms the input signal to a domain that emphasizes the repetitive structure of the watermark (22). One such transform is an autocorrelation. Another is a Fourier transform. Note that the autocorrelation can be implemented using the Fourier transform. Other examples include convolution operations. These examples of transforms share the property that they emphasize the periodic or repetitive watermark structure in the form of a detectable pattern of peaks. The transformed signal is mapped into a log polar domain (24). In this domain, a matched filter detects the pattern associated with the repetitive structure (26), and the location of the detected pattern in log polar space indicates the location of the embedded digital watermark and its rotation and scale parameters (28).

Having described the process in general, we now explore the method of using autocorrelation as the transform in more detail. In our example, the watermark w(x,y) is embedded in the spatial domain of the host image I(x,y) (of size x×y) as follows:

$$I_w(x,y) = I(x,y) + g(x,y)w(x,y) \quad (1)$$

where g(x,y) is an adaptive gain, which is used to reduce image distortion while maximizing watermark detection.

The watermark w(x,y) is constructed by repeating an elementary watermark tile ŵ(x,y) (of size K×L) in a non-overlapping fashion, such that it covers I(x,y).

The watermark can also be embedded in the magnitude of the Fourier transform of I(x,y) as follows:

$$\|\Im(I_w(x,y))\| = \|\Im(I(x,y))\| + g(u,v)w(u,v) \quad (2)$$

where $\Im(\bullet)$ represents the 2-D Fourier transform and $\|\bullet\|$ is the magnitude operator. The autocorrelation function η(m,n) of the watermarked image $I_w(x,y)$ can be expressed as follows:

$$\eta(m,n) = \sum_{x=0}^{X-1} \sum_{y=0}^{Y-1} I_w(m,n) I_w(m+x, n+y) \quad (3)$$

When equation (1) is substituted in the above equation, η(m,n) can be written as:

$$\eta(m, n) = \sum_{x=0}^{X-1} \sum_{y=0}^{Y-1} I(m, n)I(m + x, n + y) + \quad (4)$$

$$\sum_{x=0}^{X-1} \sum_{y=0}^{Y-1} g(m, n)w(m, n)$$

$$g(m + x, n + y)w(m + x, n + y) +$$

$$\sum_{x=0}^{X-1} \sum_{y=0}^{Y-1} g(m, n)w(m, n)I(m + x, n + y) +$$

$$\sum_{x=0}^{X-1} \sum_{y=0}^{Y-1} I(m, n)g(m + x, n + y)w(m + x, n + y)$$

The cross-correlation terms (last two terms) of the above equation can be ignored, since the watermark can be safely assumed to be uncorrelated with the host image. In this case, the autocorrelation function can be simplified to $$\eta(m,n) \approx \phi(m,n) + \psi(m,n) \quad (5)$$

where φ(m,n) is the autocorrelation function of the host image and ψ(m,n) is the autocorrelation function of the scaled watermark w(x,y). If ŵ(x,y) is designed to be uncorrelated random noise, its autocorrelation function will be a delta function. This causes peaks to occur in the autocorrelation function ψ(m,n) exactly at locations corresponding to the relative offsets of watermark tiles ŵ(x,y). The constellation formed by these correlation peaks forms a template that can be exploited for re-synchronization. Applying a linear transformation A to $I_w(x,y)$ causes the autocorrelation coefficients η(x,y), thus the peaks, to move to new locations (x',y') according to the equation:

$$[x' y']^T = A[xy]^T \quad (6)$$

For a uniform scaling by factor S and a counter clockwise rotation by angle θ, A is given by:

$$A = \begin{bmatrix} S\cos\theta & -S\sin\theta \\ S\sin\theta & S\cos\theta \end{bmatrix} \quad (7)$$

It should be noted that in the case of frequency domain watermark embedding, according to equation (2), the autocorrelation function η(m,n) must be computed using $\|\Im(I_w(x,y))\|$, instead of $I_w(x,y)$. In this case, the assumption that the watermark is not correlated with the host image is more applicable. This is because the coefficients resulting from the Fourier transform are normally de-correlated and the energy is concentrated on a few coefficients. This makes the FFT coefficients less correlated with the pseudo-random watermark. It also reduces image interference with the correlation peaks.

Transforming the Cartesian coordinates of equation (6) into polar coordinates using x=ρ sin α, y=ρ cos α and x'=ρ sin α', y'=ρ cos α', and substituting equation (7), the following equation can be obtained:

$$\begin{bmatrix} \rho'\cos\alpha' \\ \rho'\sin\alpha' \end{bmatrix} = S\rho \begin{bmatrix} \cos(\alpha + \theta) \\ \sin(\alpha + \theta) \end{bmatrix} \quad (8)$$

The above equation suggests that if the autocorrelation function is re-sampled using log-polar mapping, the following results can be obtained:

$$\begin{bmatrix} \alpha' \\ \log\rho' \end{bmatrix} = \begin{bmatrix} \alpha \\ \log\rho \end{bmatrix} + \begin{bmatrix} \theta \\ \log S \end{bmatrix} \quad (9)$$

where the origin of the log-polar mapping is chosen at the center of the image. Equation (9) converts any rotation in the watermarked image into a shift in the horizontal axes. The magnitude of this shift exactly equals the rotation angle. Similarly, it converts any scaling in the image into a shift in the vertical axes. The magnitude of this shift exactly equals the log of the scaling factor. These two linear shifts in log-polar domain can be detected using the following POM:

$$\xi(m, n) = \mathcal{F}^{-1}\left(\frac{\mathcal{F}(LP(\eta(m, n)))^* * \mathcal{F}(LP(\phi(m, n)))}{\|\mathcal{F}(LP(\eta(m, n)))\|}\right) \quad (10)$$

where "*" denotes the complex conjugate, LP(•) is the log-polar mapping and φ(m,n) is the autocorrelation of the embedded watermark before rotation and scaling, which can be generated by creating a hypothetical pattern with zeros everywhere and with ones at the expected peak locations. The ξ(m,n) represents the output of the POM filter, which contains a peak at the location $(m_0, n_0)$. The scaling factor, S, and the rotation angle, θ, are related to the values of $m_0$ and $n_0$ as follows:

$$S = \begin{cases} e^{-m_0} & m_0 \leq X/2 \\ e^{X-m_0} & m_0 > X/2 \end{cases} \quad (11)$$

$$\theta = n_0$$

where X is the height of the log-polar mapped image.

We implemented the method described above and tested it with a watermarking algorithm similar to Digimarc's ImageBridge™ digital watermarking system. The watermark tiles in this algorithm are square (i.e. K=L). The exemplary image (600×432) shown in FIG. 2A was watermarked and then rotated 27° counter-clockwise and scaled by a factor of 0.91 using Matlab. The resulting image is shown in FIG. 2B.

Before computing the autocorrelation function η(m,n), the image in FIG. 2B was processed using a non-linear high pass filter in order to remove the host image and hence improve the signal to noise ratio. The filtered image is shown in FIG. 3A. The image in FIG. 3A was then doubled in both dimensions by padding it with zeros, before computing the autocorrelation function using the FFT. The zero padding is necessary in order to compute the linear instead of the circular correlation. The resulting autocorrelation function is shown in FIG. 3B. To improve viewing after printing, all peaks in the figure have been manually exaggerated. The implicit template and its weak peaks can be observed in the figure.

FIG. 3C shows a hypothetical autocorrelation function representing the image before rotation and scaling. The figure represents nine watermark tiles at the center of the image. This minimum number of tiles was chosen in order to reduce the effect of the noise from the host image and in order to reduce the ambiguity due to the cyclic nature of the pattern template in the autocorrelation image.

When FIG. 3B is compared with FIG. 3C, it can be observed that the center portion of the template in FIG. 3B is a rotated and scaled version of that in FIG. 3C. The rotation angle between the two templates is 27° counter-clockwise, and the distances between the peaks in FIG. 3B are slightly shorter than those in FIG. 3C.

Figure 4A:
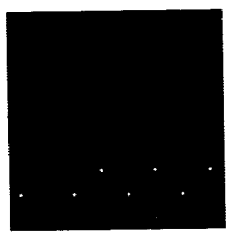
FIG. 4A is the log polar mapping of FIG. 3B.
Figure 4B:
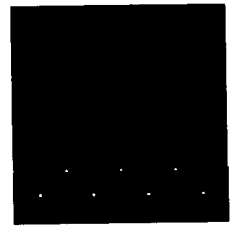
FIG. 4B is the log polar mapping of FIG. 3C.

The log-polar mappings of the images in FIGS. 3B and 3C are shown in FIGS. 4A and 4B, respectively. Again, the peaks in these figures were exaggerated for the purpose of better viewing after printing. The angle coordinate is plotted on the horizontal axis, and it was sampled at a rate of one sample per degree. The radial coordinate is plotted on the vertical axis and it was sampled such that $\sqrt{2} \times 256$ samples fall in half the maximum of the width and length of the image. Hence, the images in the figure are 362×360 pixels. Also, in computing the log-polar, we attempted to reduce the effect of the autocorrelation of the host image by excluding a small area around the origin. As seen in FIG. 3B, this area has high energy that decays away from the center. This energy is mainly due to the host image and can give no information about the tile relative locations.

Figure 4C:
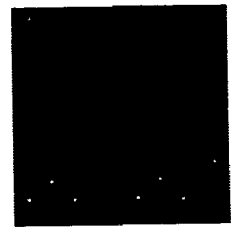
FIG. 4C is the log polar mapping of the autocorrelation of an image watermarked with tiles of a 128 by 100 random pattern.

By comparing FIGS. 4A and 4B, a horizontal (left) and vertical (up) shifts can be observed between the patterns in these figures. These shifts are due to scaling and rotating the watermarked image. The vertical and horizontal distances between the peaks in the pattern are related to the dimensions (K and L) of the tile. When K is not equal to L, the pattern becomes less regular than it is in FIG. 4. The log-polar mapping of the autocorrelation function of a watermarked image embedded with a 128×100 random pattern watermark tile is shown in FIG. 4C.

Figure 5A:
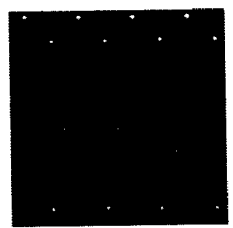
FIG. 5A illustrates the results of a phase only matched filter when applied to the image in FIG. 4A.

The output $\xi(m,n)$ of the POM filter is shown in FIG. 5A, which shows several high energy peaks. These peaks are due to the cyclic nature of the pattern in FIG. 4, and each of them corresponds to one of the 8 nearest neighboring watermark tiles. The energy in these peaks is several times that of the peaks in FIG. 3B, so they are much easier to detect.

Figure 5B:
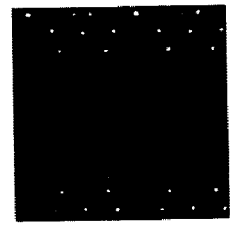
FIG. 5B illustrates the results of the phase only matched filter when applied to the image in FIG. 4C.

As it is the case with the other peak finding methods used with the autocorrelation technique, the values of the measured scale and rotation may have some ambiguity. This ambiguity is due to the regularity of the autocorrelation peaks, and it is limited to a factor of $\sqrt{2}$ in the scale and a multiple of 45° shift in the rotation angle. Hence, it can be resolved by trial and error during the reading stage of the watermark. The ambiguity can also be reduced to a 180° shift in the rotation angle by using a non-square (K≠L) watermark tile. In this case, the pattern in the log-polar image becomes less regular (see FIG. 4C), and the POM filter produces two strong peaks separated by 180° and several other weaker peaks. One of the strong peaks is the correct peak. FIG. 5B shows this case for a 128×100 random pattern watermark tile.

Finally, the location of the 12 highest peaks in FIG. 5 was measured and used in equation (11) to calculate the scale factor and orientation angle. The correct scale and orientation was observed to correspond to the highest peak. The above process was repeated with various combinations of rotations and scales. The tested rotation angels are 0, ±37, ±65, ±90, ±135, ±161, and the tested scale factors are 0.75, 0.85, 0.95, 1, 1.05, 1.15, 1.25. For every combination of rotation and scale, the highest 12 peaks were detected in the log-polar image, and the corresponding rotation angles and scale factors were determined.

In order to compare the accuracy of the proposed method, we compared it to the peak finding method suggested in the literature: M. Kutter, "Watermarking Resisting to Translation, Rotation and Scaling," Proc. of SPIE: Multimedia Systems and Applications, vol. 3528, pp. 423–431, Boston, November 1998; and Po-Chyi Su and C.-C. Jay Kuo, "An Image Watermark Scheme to Resist Generalized Geometrical Transformations," Proc. of SPIE: Multimedia Systems and Applications III, vol. VV08, Boston, USA, November 2000.

We also detected the highest 12 peaks close to the image center and calculated the corresponding orientations and scales. We then used the closest rotation and scale to the true rotation and scale in order to calculate the average detection error (ADE). Similarly, we calculated the ADE for our proposed log-polar method. The ADE is defined by equation (12):

$$ADE = \frac{1}{N}\sum_{n=1}^{N} \sqrt{(S_{actual} - S_{detected})^2 + (\theta_{actual} - \theta_{detected})^2} \quad (12)$$

The average ADE for our log-polar method was found to be 0.002479, while for the peak finding method suggested in the cited literature, the ADE was 0.176861. This indicates that the log-polar method is more accurate than that suggested in the cited literature. The main cause of the inaccuracy in the peak finding method is due to the gradient calculation, which is used to boost the energy in the peaks before detecting them. This calculation tends to slightly shift the locations of the peaks. The accuracy of the log-polar method comes at the expense of an increase in computation due to the bi-cubic interpolation used in computing the log-polar mapping. Also, the log-polar method is applicable when the scale is uniform.

CONCLUDING REMARKS

Having described and illustrated the principles of the technology with reference to specific implementations, it will be recognized that the technology can be implemented in many other, different, forms. To provide a comprehensive disclosure without unduly lengthening the specification, applicants incorporate by reference the patents and patent applications referenced above.

The methods, processes, and systems described above may be implemented in hardware, software or a combination of hardware and software. For example, the auxiliary data encoding processes may be implemented in a programmable computer or a special purpose digital circuit. Similarly, auxiliary data decoding may be implemented in software, firmware, hardware, or combinations of software, firmware and hardware. The methods and processes described above may be implemented in programs executed from a system's memory (a computer readable medium, such as an electronic, optical or magnetic storage device).

The particular combinations of elements and features in the above-detailed embodiments are exemplary only; the interchanging and substitution of these teachings with other teachings in this and the incorporated-by-reference patents/applications are also contemplated.

We claim:

1. A method of determining distortion of a signal with embedded data comprising:

transforming the signal into a transform domain to produce peaks due to a repetitive structure of the embedded data in the signal;

performing a mapping of the transformed signal to convert distortion of the embedded data into a shift; and performing a correlation of the mapped signal with a signal representing an expected pattern of peaks associated with the repetitive structure of the embedded data signal, wherein the correlation detects the shift, and the shift provides a measure of the distortion of the signal.

2. The method of claim 1 wherein transforming comprises an autocorrelation of the signal.

3. The method of claim 1 wherein the mapping includes a log-polar mapping to convert scaling and rotation into spatial shifts.

4. The method of claim 1 wherein the correlation is computed using a matched filter.

5. The method of claim 1 wherein the embedded data is repeated in the signal as rectangular blocks.

6. A tangible medium on which is stored instructions for performing the method of claim 1.

* * * * *